United States Patent [19]

Wilkinson et al.

[11] Patent Number: 4,660,103
[45] Date of Patent: Apr. 21, 1987

[54] RECORDING AND REPRODUCING DIGITAL AUDIO SIGNALS FORMED INTO GROUPS OF VARYING LENGTHS

[75] Inventors: James H. Wilkinson, Basingstoke, United Kingdom; Peter C. Boreland, Waterbury, Conn.

[73] Assignee: Sony Corporation, Tokyo, Japan

[21] Appl. No.: 772,451

[22] Filed: Sep. 4, 1985

[30] Foreign Application Priority Data

Sep. 17, 1984 [GB] United Kingdom ............... 8423452

[51] Int. Cl.$^4$ .................... H04N 5/782; G11B 20/12
[52] U.S. Cl. .................................... 360/18; 360/19.1; 360/36.2; 360/48; 358/339; 358/343; 371/38
[58] Field of Search ............... 358/339, 343, 341, 320, 358/337, 261, 313; 360/18.1, 19.1, 8, 26, 31, 32, 36.2, 39, 40, 42, 48; 369/59

[56] References Cited

U.S. PATENT DOCUMENTS

| | | | |
|---|---|---|---|
| 3,916,095 | 10/1975 | Weber et al. | 358/261 |
| 4,065,787 | 12/1977 | Owen et al. | 358/339 |
| 4,110,785 | 8/1978 | Dischert et al. | 360/36.2 |
| 4,348,699 | 9/1982 | Tsuchiya et al. | 360/32 |
| 4,477,844 | 10/1984 | Nakano et al. | 360/19.1 |
| 4,499,506 | 2/1985 | Takahashi et al. | 358/343 |
| 4,532,621 | 7/1985 | Nakagawa | 369/59 |
| 4,562,577 | 12/1985 | Glover et al. | 369/59 |
| 4,604,658 | 8/1986 | Hibino et al. | 358/339 |

Primary Examiner—Raymond F. Cardillo
Assistant Examiner—Robert A. Weinhardt
Attorney, Agent, or Firm—Lewis H. Eslinger; Alvin Sinderbrand

[57] ABSTRACT

A method of recording a digital audio signal in association with a digital video signal which is to be recorded in oblique tracks on a magnetic tape using a rotary head the rotational frequency of which is locked to the digital video signal, comprises the steps of assembling incoming audio data words which correspond to successive samples of an audio signal into groups nominally of N audio data words where N is the number of audio samples corresponding to the digital video signal to be recorded in one oblique track, allowing the number of audio data words in each group to vary preferably over the range N−1 to N+1 to maintain synchronism of the audio signal with the rotational frequency of the rotary head, coding the audio data words into error-correcting blocks for recording by the rotary head, and associating with each error-correcting block a status code for use on reproduction and which indicates whether the number of audio data words in the corresponding group is N−1, or N+1.

7 Claims, 3 Drawing Figures

RECORDING AND REPRODUCING DIGITAL AUDIO SIGNALS FORMED INTO GROUPS OF VARYING LENGTHS

BACKGROUND OF THE INVENTION

1. Field of the Invention

This invention relates to methods of recording and reproducing audio signals, and more particularly to methods of recording and reproducing digital audio signals in association with digital video signals using a digital video tape recorder (VTR).

2. Description of the Prior Art

It is known to record digital audio signals in oblique tracks on a magnetic tape together with digital video signals using a digital VTR. In such a case, it is necessary to provide synchronization of the digital audio signals, because the rotational frequency of the head drum of the digital VTR is locked to the digital video signals. This rotational frequency is normally 150 Hz, so three rotations of the drum and hence three head assembly scans correspond to one field of a 625-line 50-field per second television system, and likewise two-and-a-half head scans correspond to one field of a 525-line 60-field per second television system.

The recommended sampling frequency for a digital audio signal is 48 KHz and if therefore the drum rotational frequency were exactly 150 Hz, this would correspond to an integral number of audio samples per head scan. If, further, the clock controlling the audio sample rate where locked to the rotational frequency of the drum, there would be no problem with audio synchronization.

There are, however, two situations in which the above assumptions do not hold true. Firstly, in 525-line 60-field per second operation using the NTSC system, the field frequency is not in fact precisely 60 fields per second, but has an off-set of one part in a thousand. In consequence, the drum rotational frequency is not precisely 150 Hz, but is 149.85 Hz. This figure will not divide integrally into 48 KHz.

To overcome this problem it has been proposed that the audio sampling frequency of 48 KHz should likewise be off-set by one part in a thousand, but clearly it is inconvenient to use different sampling frequencies for the audio signals of different television systems.

Secondly, the audio sample rate may not in fact be precisely synchronized to the drum rotational frequency, due to imperfect locking of the frequencies of the various systems within a television studio. The same problem arises with the video signals, but it is easily overcome in that case by use of a field store or a frame store so that periodicaly a field or a frame can be omitted or repeated to restore synchronization. A similar technique cannot of course be used for the audio signals without severe degradation of the reproduced sound.

SUMMARY OF THE INVENTION

One object of the present invention is to provide an improved method of recording a digital audio signal in association with a digital video signal.

Another object of the present invention is to provide a method of recording a digital audio signal in association with a digital video signal, in which the number of audio samples recorded in an oblique track on a magnetic tape is varied to maintain synchronism.

Another object of the present invention is to provide a method of recording a digital audio signal in association with a digital video signal, in which the number of audio samples recorded in an oblique track on a magnetic tape is varied to maintain synchronism and a status code indicating the number of audio samples is also recorded.

According to the present invention there is provided a method of recording a digital audio signal in association with a digital video signal which is to be recorded in oblique tracks on a magnetic tape using a rotary head, the rotational frequency of which is locked to said digital video signal, the method comprising the steps of:

assembling incoming audio data words which correspond to successive samples of an audio signal in an audio channel into groups nominally of N said audio data words per group, where N is the number of audio samples corresponding to the digital video signal to be recorded in a said oblique track;

allowing the number of said audio data words in each said group to vary over the range $N-n$ to $N+n$, where n is a positive integer, to maintain synchronism of said audio data words with said rotational frequency;

coding said audio data words into error-correction blocks for recording;

associating with each said block a status code for use on reproduction and which indicates the number of said audio data words in the corresponding said group; and recording said blocks with said digital video signal in a said oblique track.

Preferably n is equal to one.

The above, and other objects, features and advantages of this invention will be apparent from the following detailed description of illustrative embodiments which is to be read in connection with the accompanying drawings.

DESCRIPTION OF THE PREFERRED EMBODIMENTS

It is now sometimes specified that a digital VTR must, in addition to being able to record a digital video signal, also be able to record four channels of digital audio signals associated with the video signal. For example, where the video signal relates to a spectator sport, the four audio channels may carry a commentary, left and right stereophonic crowd sounds, and sounds from a microphone directed towards the area of action. Each audio signal is sampled and pulse code modulation coded to form 16-bit audio data words, which are normally divided into pairs of 8-bit audio data words prior to recording, for conformity with the 8-bit video data words formed by coding video samples, and so that common circuitry can be used for processing the 8-bit audio and video data words.

Figure 1:
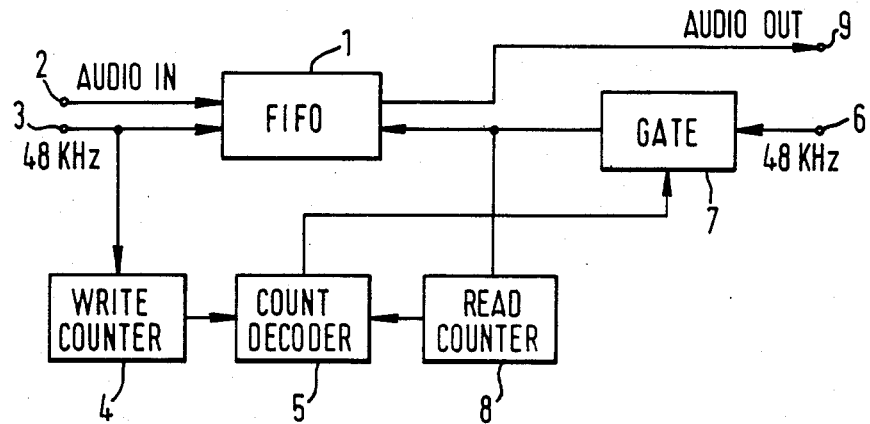
FIG. 1 shows in block form apparatus used prior to recording in synchronizing a digital audio signal.

FIG. 1 shows in block form apparatus used prior to recording in synchronizing the digital audio signal in one of the four channels. Apparatus of this form is provided for each of the four channels respectively. The apparatus comprises a first-in-first-out (FIFO) memory 1 to which input terminals 2 and 3 are connected. To the input terminal 2 are supplied the 16-bit audio data words of the respective channel, and the input terminal 3 is supplied with write clock pulses which are synchronized with the audio data words and are nominally at a frequency of 48 KHz. This frequency is crystal locked and although it may vary slightly from the exact frequency of 48 KHz, such variation is specified to be very small, for example, one part in $10^5$. The maixmum variation therefore corresponds to only approximately one sample per two seconds.

Also connected to the input terminal 3 is a write counter 4 which supplies an output to a count decoder and register 5. The write counter 4 needs only to be a 2-bit counter, although for greater hardware convenience a 4-bit counter may be used. The FIFO memory 1 also has an input terminal 6 to which are supplied read clock pulses, nominally of 48 KHz, but locked to the rotational frequency of the head drum of the digital VTR on which the audio signals are to be recorded. The input terminal 6 is connected to the FIFO memory 1 by way of a gate 7, the output of which is also connected to a read counter 8, which is similar to the write counter 4, and which supplies an output to the count decoder and register 5. The FIFO memory 1 supplies the output audio data words to an output terminal 9.

The apparatus is re-set once per rotation of the head drum of the digital VTR and the FIFO memory 1 is interrogated once per head scan of the digital VTR. The count decoder and register 5 comprisess a programmable read-only memory (PROM) and operates to compare the counts stored by the write counter 4 and the read counter 8 once per head scan of the digital VTR.

The operation of the apparatus is as follows. If the head drum of the digital VTR were rotating at precisely 150 Hz and the input audio clock were precisely 48 KHz, then the system would be locked so that during each head scan period of the digital VTR precisely 320 audio data words would be read into and read out from the FIFO memory 1. Of course the writing leads the reading, and from an instant when the write counter 4 and the read counter 8 have been re-set, the write counter receives 320 audio clock pulses corresponding to 320 audio data words read into the FIFO memory 1. As those same audio data words are read out, they are counted by the read counter 8 which is counting the read clock pulses. The count decoder and register 5 compares the count stored in the write counter 4 with the count stored in the read counter 8. When the read counter 8 has received 319 pulses, a comparison is made, and in the present case the comparison of the count then stored in the read counter 8 with the count then stored in the write counter 4 will show a lack of correspondence. The count decoder and register 5 therefore controls the gate 7 such that a further read clock pulse is supplied to the FIFO memory 1 and is counted by the read counter 8, bringing the count then stored in the read counter 4 and the count then stored in the write counter 8 into correspondence. Thereupon the count decoder and register 5 supplies an output 2-bit status code indicating that in the period corresponding to that head scan of the digital VTR the number of audio data words was 320.

It might be, however, that due to a slight lack of audio synchronization, which may, for example, be for one of the two reasons referred to above, the number of audio data words read in is not precisely 320. The maximum variation is only one per head scan period, so the possible number of audio data words read in varies only in the range 319 to 321. The count decoder and register 5 operates to maintain the number of audio data words stored in the FIFO memory 1 at the number corresponding to the mid-loading condition. Thus, if the write counter 4 stores a count indicating that in a given head scan period one less audio data word has been read in, that is only 319 audio data words were read in, then the count decoder and register 5 will operate by comparison of the count stored in the read counter 8 with that stored in the write counter 4 to stop the gate 7 supplying the final read clock pulse to the FIFO memory 1, so that only 319 audio data words are read out. Likewise, if the write counter 4 indicates that an additional audio data word has been read in, making a total of 321 in that head scan period, the counter decoder and register 5 will control the gate 7 to pass two additional read clock pulses, so that a total of 321 audio data words are read out in that head scan period. The 2-bit status code supplied in those cases will indicate the number of audio data words in the head scan period according to some predetermined code. For example, 00 may indicate 320 audio data words, 01 may indicate 319 audio data words and 10 may indicate 321 audio data words, while 11 may indicate an error condition.

Figure 2:
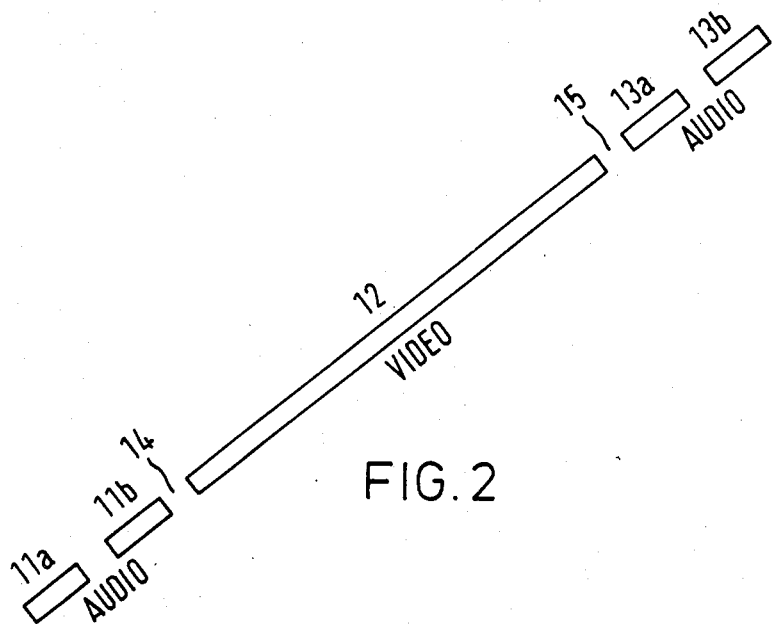
FIG. 2 shows diagrammatically an oblique track recorded on a magnetic tape.

It is convenient next to consider how the digital VTR records the audio and video signals. In this particular example it is assumed that the digital VTR is a 4-head machine, and FIG. 2 shows diagrammatically an oblique track recorded on a magnetic tape by one head of the 4-head digital VTR. The oblique track comprises an audio portion 11 at the beginning of the scan, a video portion 12 in the centre of the scan, and a second audio portion 13 at the end of the scan. At least between the portions 11 and 12, and 12 and 13 are edit gaps 14 and 15 respectively, to permit independent editing of the audio and video signals. Each of the audio portions 11 and 13 comprises two sectors 11a and 11b, and 13a and 13b, respectively.

The four heads of the digital VTR record four such oblique tracks simultaneously in each scan, and the video portions 12 of twelve successive oblique tracks, three recorded by each head of the digital VTR, comprise the video data words for one field of a 625-line 50-field per second television signal.

Each of the 16-bit audio data words is divided into two 8-bit audio data words, as mentioned above, and the 8-bit audio data words are assembled into pairs. With each pair of 8-bit audio data words are associated a pair of 8-bit double-error correcting code check words generated using a known Reed Solomon error correcting code. The resulting 8-bit audio-related data words, this term including both the audio data words and the associated check words, for the four audio channels are then distributed between the four heads of the digital VTR for recording. The assembly of the 8-bit audio data words into pairs, the error-correction code and the distribution of the audio-related data words to the four heads are together effective to reduce the effects on the output reproduced audio signals of errors arising during recording and reproduction. Further details are to be found in our copending UK patent application No. 8422769 (U.S. patent application Ser. No. 766,268.

The effect of splitting the 16-bit audio data words and of adding the check words is to increase the number of audio-related data words by a factor of four relative to the number of audio samples per second, but as there are four sectors 11a, 11b, 13a and 13b in each oblique track and four heads in the head assembly of the digital VTR, the number of audio-related data words to be recorded in each oblique track when the rotational frequency of the drums is exactly 150 Hz and the audio signals are precisely synchronized with the drum rotational frequency is 320 per sector. That is to say, in this case, the number of active audio-related data words is 320 per sector.

However, when there is a lack of synchronization, for example, for one of the two reasons mentioned above, then the number of 16-bit audio data words in any of the four channels may vary over the range 319 to 321 per head scan period. Due to the distribution of the audio-related data words to the four heads, the number of audio-related data words in any one sector may vary over the range 316 to 324. Provision is therefore made in each sector to record 324 audio-related data words, and if the number which it is actually required to be recorded is less than 324, then the balance is made up with dummy words.

The audio-related data words to be recorded in each sector are divided into six blocks and with each block are associated error-detection check words, generated using a known error detection code, such as a cyclic redundancy check code. Within each block is also included an 8-bit status code, made up of the 2-bit status codes corresponding to each of the four channels. Thus, the status information corresponding to each of the channels is recorded in each of the blocks in each of the sectors in each of the oblique tracks in each head scan. This is necessary so that in error conditions where one or more sectors are lost or corrupted due for example to physical damage to the magnetic tape or head clogging, the status information is available to enable the audio information to be decoded after reproduction.

Figure 3:
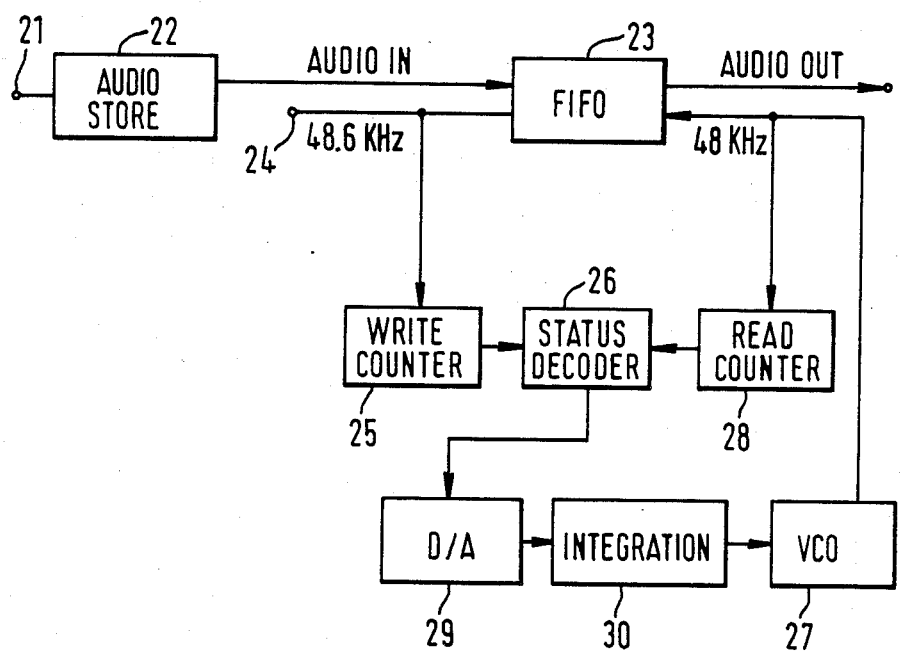
FIG. 3 shows in block from apparatus used subsequent to reproduction in synchronizing a digital audio signal.

FIG. 3 shows in block form apparatus used subsequent to reproduction in synchronizing the digital audio signals. Apparatus of this form is provided for each of the four channels respectively. The apparatus comprises an input terminal 21 to which the 16-bit audio data words are supplied subsequent to reproduction, error detection, correction and redistribution into the respective channels. An audio store 22 connected to the input terminal 21 therefore only stores valid 16-bit audio data words, together with the two-bit status codes. The output of the audio store 22 is connected to the input of a FIFO memory 23, to which is also connected an input terminal 24 to which is supplied a write clock pulse of 48.6(324×48÷320) KHz locked to the rotational frequency of the head drum of the digital VTR. Also connected to the input terminal 24 is a write counter 25, the output of which is connected to a status decoder and register 26. A read clock pulse is supplied to another input of the FIFO memory 23 by a voltage controlled oscillator 27 which may be a crystal or L/C oscillator and which has a nominal frequency of 48 KHz. The read clock pulse signal is also supplied to a read counter 28, the output of which is connected to the status decoder and register 26. The status decoder and register 26 supplies a control voltage to the oscillator 27 by way of a digital-to-analog (D/A) converter 29, the output of which is supplied by way of an integration circuit having a long time constant, for example, 0.5 second, to the oscillator 27. The audio data words read out of the FIFO memory 23 are supplied to an output terminal 31.

The operation of this apparatus is as follows. The valid audio data words are read out of the audio store 22 into the FIFO memory 23 under control of the 2-bit status code whereby it is known whether 319, 320 or 321 audio data words are to be read corresponding to the respective head scan. The status decoder and register 26 operates to maintain the FIFO memory 23 in its mid-loading condition by slowly ramping the frequency of the oscillator 27 up or down. The write counter 25 and the read counter 28 are 2-bit (or 4-bit) stores and the status decoder and register 26 comprises a PROM. All are re-set once per head scan period. At the end of each head scan period the status decoder and register 26 determines, in accordance with the count then stored in the write counter 25 and the read counter 28, whether the number of audio data words stored in the FIFO memory 23 is decreasing, remaining stationary or increasing, and in dependence thereon supplies an output to the D/A converter 29 which, by way of the integration circuit 30, supplies the control voltage to the oscillator 27 such that the frequency of the read clock pulses is very slowly varied so as to maintain the FIFO memory 23 in its mid-loading condition. In this way the output audio data words supplied to the output terminal 31 can be maintained in synchronism with the input audio data words. If the status code indicates an error, the frequency of the oscillator 27 is re-set to 48 KHz.

Because the status decoder and register 26 is in effect a phase detector, it is necessary for the integrator 30 to incorporate some phase lag compensation to maintain the loop comprising the elements 26, 29, 30 and 27 stable.

As described, the synchronization is operative on each individual channel, but there may be circumstances where it is required to maintain the synchronism between two or more of the four channels. Thus, if two of the channels are carrying signals corresponding to a stereophonic pair, or if the four channels are carrying quadrophonic signals, then the respective channels additionally need to be maintained in synchronization with each other. This can be achieved by a modification of the apparatus of FIG. 1 whereby the count decoder and register 5 in each of the four channels is linked to a device such as an erasable programmable read-only memory (EPROM) which controls the respective count decoders and registers 5 so that when two or more of the four audio channels need to be kept in synchronism with each other, the respective count decoders and registers 5 are controlled so that the number of audio data words read out of the FIFO memories 1 in those channels is the same in each head scan period. Thus, the number of audio data words read out will normally be 320 per head scan period for each of the channels, but if, for example, the number in one head scan period for a channel carrying one of a pair of stereophonic signals is 319, then the count decoder and register 5 in the channel corresponding to the other stereophonic signal of the pair will likewise be controlled to be 319 in that head scan period.

Thus a range of different controls are possible which, if the four channels are designated A, B, C and D, may include some or all of the following:

1. All the channels A to D are independently synchronized.
2. The channels A and B are synchronized together and the channels C and D are independently synchronized.

3. The channels A and B are independently synchronized and the channels C and D are synchronized together.
4. The channels A and B are synchronized together and the channels C and D are synchronized together.
5. All the channels A to D are synchronized together.

Various modifications are possible, and in particular the number of audio data words corresponding to a head scan period will depend on the audio sampling frequency, and the rotational frequency of the head drum of the digital VTR. Moreover, although in the above description the maximum divergence in the number of audio data words in each audio channel in one head scan period is plus or minus one, the invention may be applied to systems where a larger divergence is required. More generally, therefore, the number of audio data words is allowed to vary over the range N−n to N+n where N is the number of audio samples corresponding to the digital video signal to be recorded in one oblique track and n is a positive integer. Where n is more than one the number of bits in the status codes will need to be increased.

The FIFO memories 1 and 23 may be replaced by other suitable devices, such as random access memories (RAMs) configured as FIFOs.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of recording a digital audio signal in association with a digital video signal which is to be recorded in oblique tracks on a magnetic tape using a rotary head, the rotational frequency of which is locked to said digital video signal, the method comprising the steps of:
    assembling incoming audio data words which correspond to successive samples of an audio signal in an audio channel into groups nominally of N said audio data words per group, where N is the number of audio samples corresponding to the digital video signal to be recorded in a said oblique track;
    allowing the number of said audio data words in each said group to vary over the range N−n to N+n, where n is a positive integer, to maintain synchronism of said audio data words with said rotational frequency;
    coding said audio data words into error-correction blocks for recording; associating with each said block a status code for use on reproduction and which indicates the number of said audio data words in the corresponding said group; and
    recording said blocks with said digital video signal in a said oblique track.

2. A method according to claim 1 wherein said audio data words are read into a memory under control of a write clock pulse signal while reading said audio data words out of said memory under control of a read clock pulse signal locked to said rotational frequency, and the difference between the number of said audio data words read into and read out of said memory in a period corresponding to one said oblique track is counted to derive said status code.

3. A method of reproducing a digital audio signal which has been recorded by a method according to claim 2, comprising the steps of:
    storing reproduced audio data words in a further memory under control of a further write clock pulse signal locked to said rotational frequency while reading said audio data words out of said further memory under control of a further read clock pulse signal of variable frequency; and
    controlling said variable frequency in dependence on said status code.

4. A method according to claim 1 wherein audio data words corresponding to audio signals of a plurality of audio channels are recorded in each said oblique track.

5. A method according to claim 4 wherein the number of audio data words in respective said groups corresponding to audio signals of different said channels are controlled to maintain synchronism between the audio signals in at least two of said audio channels.

6. A method according to claim 1 wherein n is equal to one.

7. A method according to claim 1 wherein said audio signal is sampled at 48 KHz and N is equal to 320.

* * * * *